US009405782B2

(12) United States Patent
Sewall et al.

(10) Patent No.: US 9,405,782 B2
(45) Date of Patent: Aug. 2, 2016

(54) PARALLEL OPERATION IN B+ TREES

(75) Inventors: Jason D. Sewall, Santa Clara, CA (US);
Changkyu Kim, San Jose, CA (US);
Jatin Chhugani, Santa Clara, CA (US);
Nadathur Rajagopalan Satish, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 13/996,508

(22) PCT Filed: Aug. 29, 2011

(86) PCT No.: PCT/US2011/049569
§ 371 (c)(1),
(2), (4) Date: Sep. 4, 2013

(87) PCT Pub. No.: WO2013/032436
PCT Pub. Date: Mar. 7, 2013

(65) Prior Publication Data
US 2013/0339395 A1    Dec. 19, 2013

(51) Int. Cl.
*G06F 17/30* (2006.01)
*G06F 9/50* (2006.01)
(52) U.S. Cl.
CPC ........ *G06F 17/30327* (2013.01); *G06F 9/5005* (2013.01); *G06F 2209/5018* (2013.01)
(58) Field of Classification Search
CPC ............ G06F 17/2247; G06F 17/2252; G06F 17/227; G06F 17/30327; G06F 17/30625; G06F 17/20961
USPC ........................................................ 707/797
See application file for complete search history.

(56) References Cited

U.S. PATENT DOCUMENTS 5,600,596 A    2/1997   Shirakihara
6,711,562 B1 *  3/2004   Ross et al. .................... 707/741
(Continued)

FOREIGN PATENT DOCUMENTS

CN    102156759 A    8/2011
WO    WO 01/44987 A2    6/2001

OTHER PUBLICATIONS

Jianzhong Li, Parallel Join Algorithms based on PArallel B+ trees, 2001, IEEE, Harbin Institute of Technology, China (See Attached).*
(Continued)

*Primary Examiner* — Hosain Alam
*Assistant Examiner* — Saba Ahmed
(74) *Attorney, Agent, or Firm* — Schwabe, Williamson & Wyatt, P.C.

(57) ABSTRACT

Embodiments of techniques and systems for parallel processing of B+ trees are described. A parallel B+ tree processing module with partitioning and redistribution may include a set of threads executing a batch of B+ tree operations on a B+ tree in parallel. The batch of operations may be partitioned amongst the threads. Next, a search may be performed to determine which leaf nodes in the B+ tree are to be affected by which operations. Then, the threads may redistribute operations between each other such that multiple threads will not operate on the same leaf node. The threads may then perform B+ tree operations on the leaf nodes of the B+ tree in parallel. Subsequent modifications to nodes in the B+ may similarly be redistributed and performed in parallel as the threads work up the tree.

17 Claims, 12 Drawing Sheets

(56) References Cited

U.S. PATENT DOCUMENTS

| | | |
|---|---|---|
| 8,204,912 B2* | 6/2012 | Bamford et al. ............... 707/797 |
| 2002/0029214 A1* | 3/2002 | Yianilos et al. ................... 707/7 |
| 2002/0059281 A1* | 5/2002 | Watanabe et al. ............. 707/100 |
| 2003/0033328 A1* | 2/2003 | Cha et al. ....................... 707/204 |
| 2003/0204513 A1* | 10/2003 | Bumbulis ...................... 707/100 |
| 2004/0107185 A1* | 6/2004 | Najork et al. ...................... 707/3 |
| 2004/0107186 A1* | 6/2004 | Najork et al. ...................... 707/3 |
| 2007/0214117 A1 | 9/2007 | Shu |
| 2010/0082664 A1* | 4/2010 | Odaira .......................... 707/769 |
| 2011/0016153 A1 | 1/2011 | Atta et al. |

OTHER PUBLICATIONS

David Taniar, Global B+ Tree Indexing in Parallel Database Systems, 2003, Monash University, School of Business Systems, Australia and La Trobe University, Department of Computer Science and Engineering, Australia (See Attached).*

International Preliminary Report and Patentability mailed Mar. 13, 2014 for International Application No. PCT/US2011/049569, 6 pages.

Extended European Search Report issued Jun. 15, 2015 for European Application No. 11871468.2, 7 pages.

Jiangmiao Liao et al: "Parallel Batch B+-tree Insertion on Multi-core Architectures", Frontier of Computer Science and Technology (FCST), 2010 Fifth International Conference on, IEEE, Piscataway, NJ, Aug. 18, 2010, pp. 30-35.

Office Action mailed Aug. 6, 2015 for Chinese Application No. 201180073146.3, 14 pages.

International Search Report and Written Opinion mailed Mar. 21, 2012 for International Application No. PCT/ US2011/049569, 9 pages.

Sung, J. et al., A parallel bulk loading method for B+-tree using CUDA, Journal of KISS: Computing Practices and Letters, Jun. 2010, vol. 16, No. 6, pp. 707-711.

Kim, S. et al., A Study on Structures for the efficient event queues, Journal of the Korea Society for Simulation, Nov. 1995, vol. 4, No. 2, pp. 61-68.

* cited by examiner

PARALLEL OPERATION IN B+ TREES

CROSS REFERENCE TO RELATED APPLICATIONS

The present application is a national phase entry under 35 U.S.C. §371 of International Application No. PCT/US2011/049569, filed Aug. 29, 2011, entitled "PARALLEL OPERATION ON B+ TREES", which designated, among the various States, the United States of America. The Specification of the PCT/US2011/049569 Application is hereby incorporated by reference.

TECHNICAL FIELD

This application relates to the technical field of data processing, more specifically to methods and apparatuses associated with performing B+ tree operations on B+ trees in parallel.

BACKGROUND

Unless otherwise indicated herein, the materials described in this section are not prior art to the claims in this application and are not admitted to be prior art by inclusion in this section.

Databases are increasingly used in modern computing systems as demand for high-throughput databases coincides with the explosion of mobile computing, cloud computing, as well as many desktop applications. These forces have rapidly driven usage, size, and importance of database systems as critical server applications.

In many databases, B+ trees may be used as indexes in databases. For example, a B+ tree may contain many keys, each of which points to a set of records in the database. B+ trees offer efficient retrieval of stored values, especially in systems with large numbers of records. However, existing techniques for retrieving values from B+ trees and for modifying the trees may not efficiently take advantage of modern parallel processing techniques and/or capabilities.

One common approach to parallel processing of B+ trees in database indexes may use separately-executing threads that each asynchronously processes a single query. However, asynchronous techniques may require latches (e.g. control over in-memory resources to prevent threads from accessing the same data) for modify operations. Additionally, asynchronous techniques may present varying needs for retrieval operations. For example, some asynchronous techniques may use differing classes of latches for retrieval and modify operations, while other asynchronous techniques may not restrict retrieval operations. In both cases, many such methods may suffer performance penalties from the use of latches, reducing the utility of parallel processing on B+ trees.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
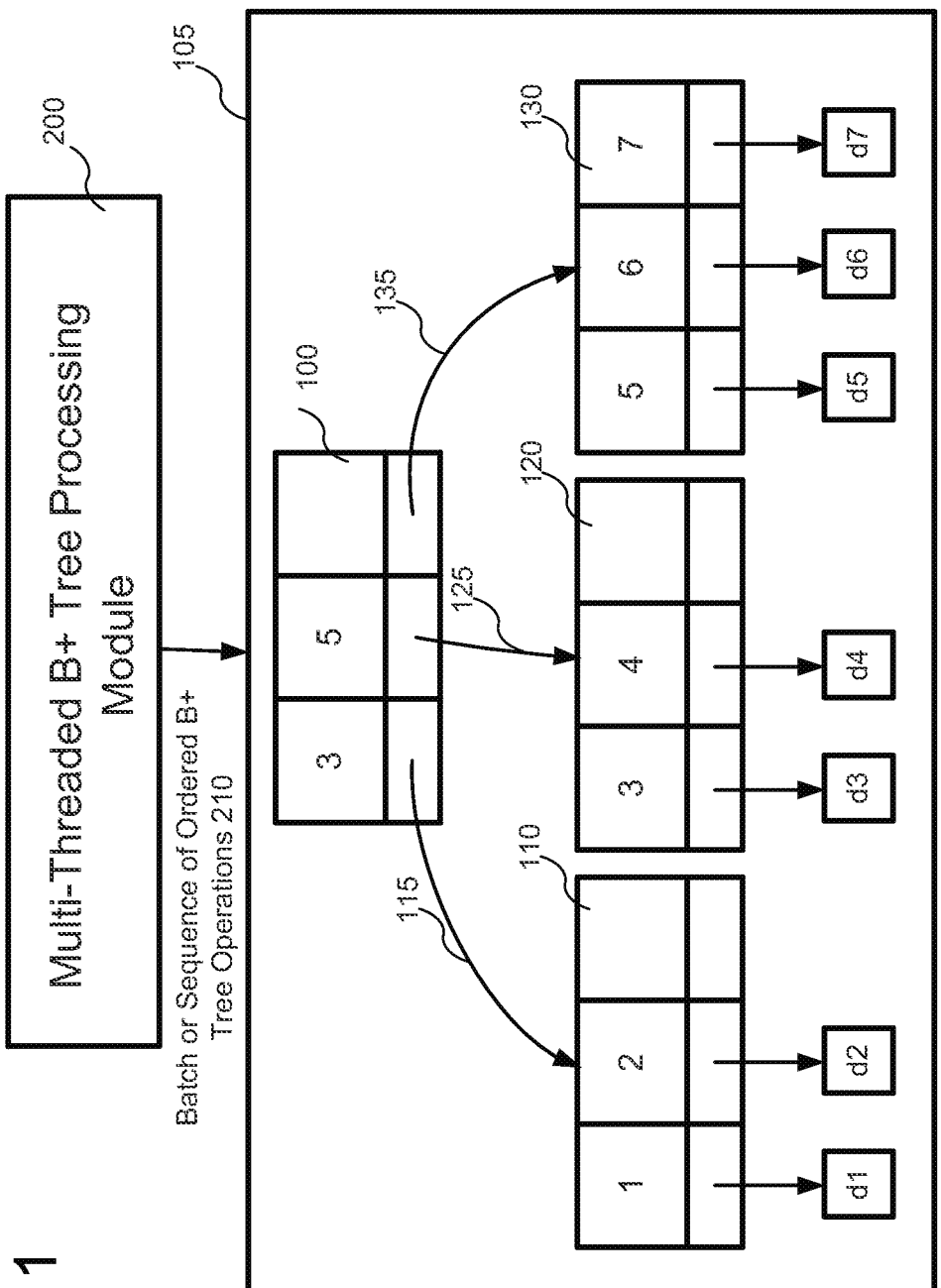
FIG. 1 is block diagram illustrating an example multi-threaded B+ tree operation module performing a batch or sequence of B+ tree operations on a B+ tree in accordance with various embodiments of the present disclosure.

Methods, apparatuses and storage media associated with parallel B+ tree operations are disclosed herein. In various embodiments, a method may include identifying, by at least a plurality of threads operated by one or more processor cores, a plurality of work sets of operations of a sequence of ordered operations to be performed on a B+ tree. The work sets of operations are set-wise independent, and may be set-wise respectively performed on leaf-nodes of the B+ tree in parallel by the threads. The work sets may be identified correspondingly by the threads in parallel. Additionally, the method may further include performing, in parallel, by the corresponding number of threads, the plurality of work sets of operations on the leaf nodes of the B+ tree. Further, the method may include modifying, by at least the plurality of threads, internal nodes of the B+ tree to account for effects of the operations performed on the leaf nodes of the B+ tree.

In various embodiments, identifying may include partitioning, by a control task, the sequence of ordered operations to generate a plurality of initial subsets of the ordered operations respectively associated with the threads. In alternate embodiments, identifying may include respectively selecting, by the plurality of threads, different one or more of the ordered operations from the sequence of ordered operations to partition the sequence of ordered operations to generate a plurality of initial subsets of the ordered operations respectively associated with the threads.

In various embodiments, identifying may further include effectively redistributing the ordered operations of the initial sets among the initial sets, by the threads, to effectively identify the set-wise independent work sets of operations. Further, effective redistributing to effectively identify may include, by respective threads out of the threads, respectively searching the B+ tree using respective initial sets of operations, to respectively identify and generate a number of initial sets of leaf nodes for the threads to respectively perform operations on. Additionally, effective redistributing to effectively identify may include, by respective threads out of the threads, respectively generating a plurality of work sets of leaf nodes, based at least in part on the initial sets of leaf nodes, by respectively selecting leaf nodes in the corresponding sets of the plurality of initial sets of leaf nodes. The threads may have corresponding thread identifiers that are ordered, and the leaf nodes selected from a corresponding initial set by a particular thread may be leaf nodes not in any initial sets corresponding to threads with thread identifiers that are lower than the thread identifier of the respective thread. The set-wise independent work sets of operations may be subsets of the sequence of ordered operations correspondingly associated with the work sets of leaf nodes.

In various embodiments, the method may include synchronizing the threads, and starting the respective generating of the work sets of leaf nodes after all threads have respectively completed the searching, and the initial sets of leaf nodes have all been generated. In various embodiments, performing may include performing in parallel, by the threads, operations of the respective work sets of operations. Further, performing, by a thread, operations of a corresponding work set of operations may include performing, by the thread, the operations of the corresponding work set of operations in order. Additionally, performing may further include respectively recording, by the threads, retrieved values of retrieve operations of the work sets of operations in corresponding retrieval buffers of the threads. The method may further include performing a union of the retrieved values stored in the retrieval buffers to form a retrieve answer set for the sequence of ordered operations.

In various embodiments, modifying may include successively modifying, by the threads, internal nodes of the B+ tree, one tree level at a time, for all internal nodes of all tree levels below a root node. Thereafter, the root node may be modified by one of the threads or a control task. In various embodiments, modifying internal nodes of a tree level immediately above the leaf nodes may include identifying in parallel, by the threads, a plurality of initial sets of modification operations that need to be made to the internal nodes of the tree level immediately above the leaf nodes, to account for effects of the operations performed on the leaf nodes of the B+ tree. Further, modifying may include effectively redistributing the modification operations of the initial sets of modification operations among the initial sets of modification operations, to effectively identify a plurality of work sets of modification operations to be performed on the internal nodes of the tree level immediately above the leaf nodes by the threads in parallel. Additionally, modifying may include performing in parallel, by the threads, the respective work sets modification operations on the internal nodes of the tree level immediately above the leaf nodes.

In various embodiments, modifying internal nodes of a particular tree level may include identifying in parallel, by the threads, a plurality of initial sets of modification operations that need to be made to the internal nodes of the particular tree level, to account for effects of the modification operations performed on the internal nodes of the immediately lower tree level. Further, modifying internal nodes of a particular tree level may include effectively redistributing the modification operations of the initial sets of modification operations among the initial sets of modification operations, to effectively identify a plurality of work sets of modification operations to be performed on the internal nodes of the particular tree level by the threads in parallel. Additionally, modifying internal nodes of a particular tree level may include performing in parallel, by the threads, the respective work sets modification operations on the internal nodes of the particular tree level.

In various embodiments, modifying a particular internal node of any tree level by a thread, may further include, after performing a modification operation on the particular internal node by the thread, splitting the particular internal node, by the thread, into two or more internal nodes, in response the modified particular internal node exceeding an upper limit on a number of elements an internal node can hold, or removing the particular internal node, by the thread, in response the modified particular internal node falling below a lower limit on a number of elements an internal node must hold.

In various embodiments, wherein the sequence of ordered operations may include one or more retrieve operations to retrieve one or more data elements associated with a key, insert operations to append one or more data elements to a data structure associated with a key, or delete operations to remove one or more data elements from a data structure associated with a key. In various embodiments, at least two of the threads may be executed by different processor cores out of the one or more processor cores.

In various embodiments, an apparatus may be equipped to practice one or more of the methods described herein. In various embodiments, the apparatus may comprise a computer-readable memory or storage configured to store a B+ tree. The apparatus may comprise a processor arrangement coupled to the memory, the processor arrangement comprising one or more processing cores. The apparatus may comprise multiple parallel tree operation modules configured to be operated by the processor arrangement to respectively perform various methods described herein. the apparatus may also comprise a control module configured to be operated by the processor arrangement to perform various methods described herein. In various embodiments one or more non-transitory computer-readable media may comprising instructions that, in response to execution by a computing device, cause the computing device to perform one or more operations of various methods described herein.

In various embodiments, a method may include partitioning, by a computer device, a sequence of ordered operations to be performed on a B+ tree to generate a plurality of initial subsets of the ordered operations. The method may further include spawning, by the computer device, multiple parallel B+ tree operation threads. The method may further include assigning, by the computer device, respective initial subsets of the ordered operations to each of the multiple parallel B+ tree operation threads. The spawned parallel B+ tree operation threads may be configured to identify a plurality of work sets of operations of a sequence of ordered operations to be performed on a B+ tree. The work sets of operations may be set-wise independent. The work sets of operations may further be set-wise respectively performed on leaf-nodes of the B+ tree in parallel by the threads. The work sets of operations may further be identified correspondingly by the threads in parallel. The pawned parallel B+ tree operation threads may be further configured to perform, in parallel, the plurality of work sets of operations on the leaf nodes of the B+ tree, and to modify internal nodes of the B+ tree to account for effects of the operations performed on the leaf nodes of the B+ tree.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The word "effectively" and the phrase "effectively redistribute" are used herein. An operation may be "effectively" performed through performing another operation, without actually performing the operation. For example, in the description, various operations are "effectively redistributed" among the threads, by the threads respectively modifying the sets of leaf nodes the threads are going to respectively perform operations on. By respectively modifying/redistributing the sets of lead nodes, the operations are "effectively redistributed" among the threads.

The phrase "set-wise independent," as used herein in describing a set of operations, refers to the fact that the operations within the set have no dependency on any other operations outside the set. For example, a set of operations may have multiple operations which operate on the same key value, and these operations may therefore be operationally order-dependent on each other for the overall execution results to be correct. For example, a Retrieve operation for a key k that follows an Insert operation for the key k is necessarily execution-order-dependent on the earlier Insert operation, or the result of the Retrieve may not produce expected results. Such execution-order-dependency between operations may not exist between operations of a set of operations A and a set of operations B if sets A and B are said to be "set-wise independent." In various embodiments, the use of the term "set" as used herein may not be construed to necessarily imply requirements of any mathematical definition of a "set." In particular, sets of operations described herein may include operations that are ordered, such as by key or by time. Additionally, a set of operations described herein may include multiple operations for a single key.

The terms "thread(s)," as used herein, refers generally to unit(s) or instance (instances) of a unit (units) of instructions that may be scheduled for processing on a computing device, in parallel. The terms as use are intended to be synonymous with and include all forms of parallel processing units, such as, but not limited to, execution threads, processes, fibers, SIMD lanes, and so forth.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Referring now to FIG. 1, FIG. 1 is a block diagram illustrating a multi-threaded B+ tree processing module 200, performing a batch or sequence of one or more ordered B+ tree operations 210 that are key based, on an example B+ tree 105, in accordance with embodiments of the present disclosure. As will be described in more details below, the multi-threaded B+ tree processing module 200 may be configured to perform ordered operations 210 substantially in parallel, operated by one or more processor cores.

In particular, in various embodiments, various execution threads (hereinafter, simply threads) of B+ tree processing module 200 may be configured to identify a number of work sets of operations of the batch or sequence of ordered operations 210. The work sets of operations are set-wise independent, and thus, may be set-wise respectively performed on leaf-nodes of B+ tree 105 in parallel by the threads. Further, the work sets may be identified correspondingly by the threads in parallel. Additionally, the threads may be configured to perform the identified work set operations on the leaf nodes of B+ tree 105 in parallel. Thereafter, the threads may modify the internal nodes of B+ tree 105 to account for effects of the operations performed on the leaf nodes of B+ tree 105.

As FIG. 1 illustrates, B+ tree 105 may include a number of internal nodes, such as root node 100. The internal nodes may include pointers to other internal nodes and/or leaf nodes, such as leaf nodes 110, 120, 130. In various embodiments, a B+ trees may include a type of B tree, where all data are stored in, or pointed to, using leaf nodes. For ease of understanding, nodes in a B+ tree may be referred to as being located at various tree levels, with the root node being located at the highest tree level (such as level 0), the root node's children being located at the next or immediate lower tree level (such as level 1), the root node's grandchildren being located at another immediate lower level still (such as level 2), etc. The leaf nodes of a B+ tree 105 may be collectively referred to as being located at the lowest tree level of the tree. While the example B+ tree 105 of FIG. 1 contains only two tree levels, the disclosure may be practiced on B+ trees of any number of tree levels, constrained only by computational resources, such as memory, storage, number and speed of processor cores, and so forth.

In various embodiments, the various data may be indexed by key. The key may be used to search for and retrieve the data from B+ tree 105. Thus, as illustrated, example leaf node 110 may contain keys 1 and 2, which respectively point to data d1 and d2. Similarly example leaf node 120 may contain keys 3 and 4 which respectively point to data d3 and d4, and example leaf node 130 may contain keys 5, 6, and 7 which respectively point to data d5, d6, and d7. Also, as illustrated, example root node 100 may include pointers 115, 125, and 135, respectively point to leaf nodes 110, 120, and 130. During operation, new keys may be inserted into B+ tree 105, along with associated data, and/or existing keys may be deleted from B+ tree 105.

In various embodiments, pointers, in conjunction with keys located in the internal nodes, may facilitate performance of B+ tree operations. Keys in internal nodes may indicate, for particular pointers, which keys may be found by following the pointer. Thus, pointer 115 points to a leaf node 110, which contains keys below 3; pointer 125 points to leaf node 120, which contains keys of value 3 or higher, but below 5; and pointer 135 points to leaf node 130, which contains keys of value 5 or higher.

In various embodiments, these pointers may be used when a B+ tree operation, such as Insert, Retrieve, and Delete (described below) is to be performed on the tree with relation to a particular key. A Retrieve operation may retrieve one or more data elements associated with a key. An Insert operation may append one or more data elements to a data structure associated with a key. A Delete operation may remove one or more data elements from a data structure associated with a key, or remove all data elements associated with a key. The keys and pointers in the internal nodes of the tree may be used to search down the tree, from top to bottom, until a leaf node containing the proper key is found. After the proper key is found, an operation may be performed. An operation may result in the addition or deletion of keys in a leaf node. This may lead to modifications of the nodes in B+ tree 105, as described below.

In various embodiments, nodes in B+ tree 105 may be bounded in degree (e.g., the number of children nodes or keys that any one node may point to). These bounds may be related to a tree "order." For example, if B+ tree 105 has an order of 4, each internal node's degree may be bounded to between 2 and 4 children, and each leaf node's degree may be bounded to between 2 and 3 keys. These bounds may be maintained after operations are performed on B+ tree 105, such as by performing modifications on the nodes of B+ tree 105.

In various embodiments, when too many children are created, such as when keys are inserted into B+ tree 105, B+ tree 105 may exceed its upper bound degree. When that occurs, a modification may be performed to split the node into additional nodes. This modification, with its creation of additional nodes, may raise the degree of the original node's parent. This may, in turn, now require one or more further modifications to be performed to the node's parent, such as splitting of the parent node. This splitting may be continued up B+ tree 105, from the leaf nodes toward the root node.

Similarly, in various embodiments, if keys are deleted from a node, the node may fall below its lower bound degree. When that occurs, one or more modifications may be performed to delete the node. Since the deleted node may have keys (or children) remaining, further modification may be performed to the node's parent to add the remaining keys (or children) into the node's parent. Further modifications may then be performed on higher levels of the tree (such as splitting the node's parent if the parent has now exceeded its upper bound degree)

In various embodiments, as operations and/or modifications are performed on a node of B+ tree 105, further modifications may be required for the nodes at higher tree levels of the tree. These modifications may be propagated up B+ tree 105 until modifications are performed on the B+ tree's root node, as described herein.

In particular implementations, a B+ tree used in accordance with various embodiments may index a column of a database. For a database D, B+ tree 105 may index a column of the database using keys from a totally-ordered set K and storing pairs $(k, r^*_k)$, where $r^*_k$ is a pointer referring to a secondary structure $r_k$ that enumerates identifiers (or "IDs") of a tuple in database D referred to with key k. Continuing this syntax, B+ tree 105 for a database, $T_D$, may, in turn, be operated on via at least three types of operations in relation to a key k, as disclosed earlier. The first operation may be a Retrieve $(T_D, k)$ operation, which, when performed, returns $r_k$ or { }, an empty set, if k is not in $T_D$. The second operation may be an operation Insert$(T_D, (k,e))$. When k is in $T_D$, performance of Insert appends a value e to $r_k$. Otherwise, a new $r_k = \{e\}$ may be added to D, and key-pointer pair $(k, r^*_k)$ may be added to $T_D$. The third operation may be a Delete$(T_D, (k,e))$ operation. When k is in $T_D$, performance of Delete may remove e from $r_k$, and if a tuple size for $r_k$, $|r_k|=0$, then $(k, r^*_k)$ may be removed from $T_D$. Otherwise, if k is not in $T_D$, a null operation may be performed.

Figure 2:
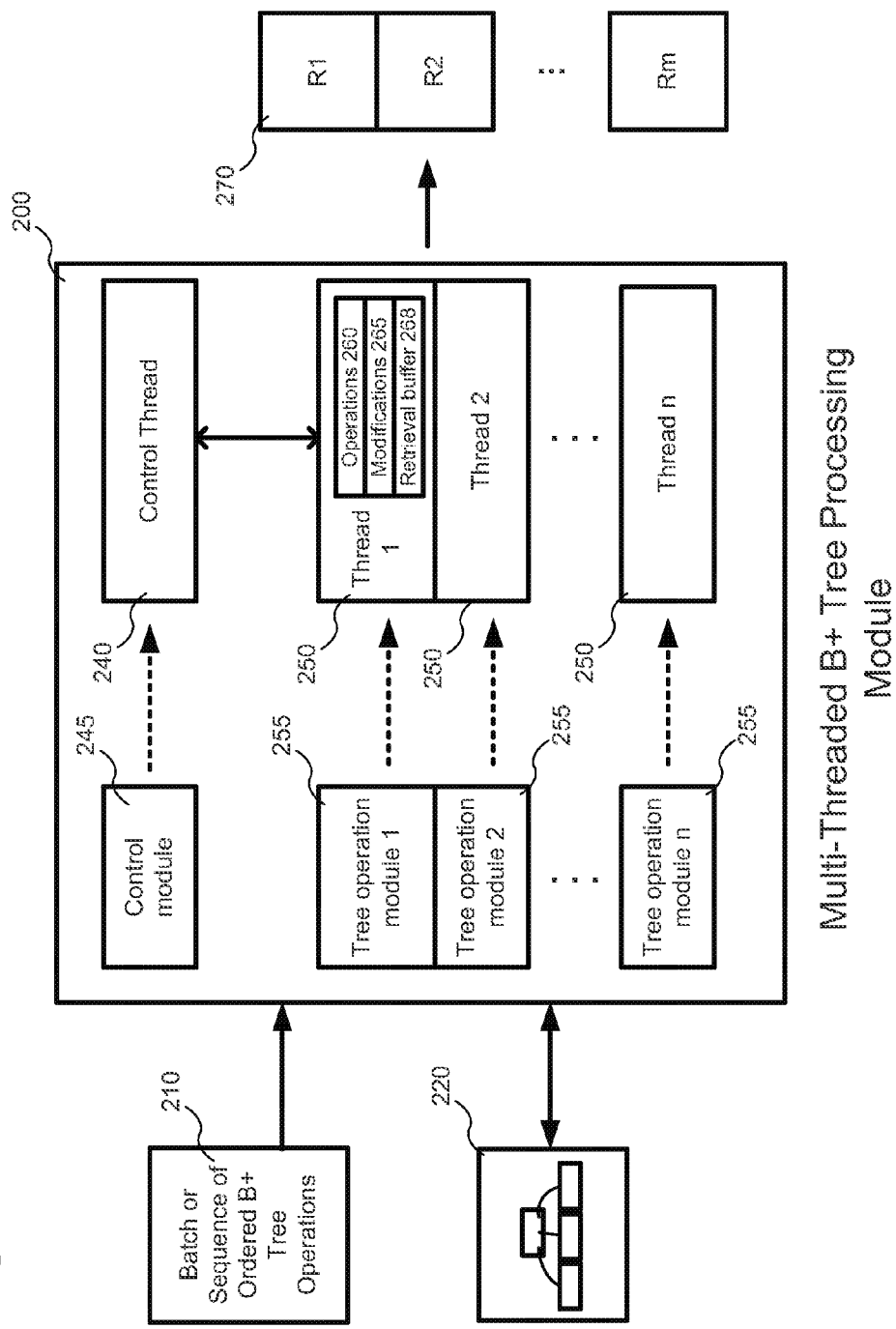
FIG. 2 is a block diagram illustrating a multi-threaded B+ tree processing module, in accordance with various embodiments of the present disclosure.

FIG. 2 is a block diagram illustrating a multi-threaded B+ tree processing module 200 in further detail, in accordance with various embodiments of the present disclosure. As illustrated, in various embodiments, multi-threaded B+ tree processing module 200 may perform a batch or sequence of ordered B+ tree operations 210 on a B+ tree 220; for example the B+ tree may represent a portion of a database. The B+ tree 220 may be maintained in memory of a computing device hosting the multi-threaded B+ tree processing module 200; in other embodiments, the B+ tree 220 may instead be stored outside of memory, such as on a storage device of the computing device. In various embodiments, the batch or sequence of ordered B+ tree operations 210 may include a number of Retrieve, Insert, and Delete operations described above.

In various embodiments, multi-threaded B+ tree processing module 200 may include a control module 245, executing as a control thread 240. The control thread 240 may be configured to partition the batch or sequence of ordered B+ tree operations 210 into a number of initial smaller sets of B+ tree operations. The control thread 240 may also spawn various B+ tree parallel operation threads 250, as described below. In alternate embodiments, one or more B+ tree parallel operation threads 250 may be pre-spawned at initialization and may wait until they have B+ tree operations to perform, before they start execution. In various embodiments, the B+ tree parallel operation threads 250 may be spawned as distinct executions of multiple instances of tree operation module 255. In various embodiments, the B+ tree parallel operation threads 250 may be spawned in a 1:1 correspondence with the tree operation module instances 255.

After the B+ tree parallel operation threads 250 are spawned, the partitioned sets of B+ tree operations may then be respectively assigned explicitly (or implicitly associated with) and used by the B+ tree parallel operation threads 250 to respectively perform the corresponding operations from the batch or sequence of ordered B+ tree operations 210 on the B+ tree 220. The B+ tree parallel operation threads 250 may be referred to herein singularly simply as a "thread 250" or collectively as "threads 250" for ease of description.

By operating different instances of the tree operation module 255 as separate threads 250, subject to constraints as discussed herein, the parallel B+ tree processing module 200 may provide for efficient parallel processing of the batch or sequence of ordered B+ tree operations 210 on the B+ tree 250. In various embodiments, threads 250 may be provided with a nominal ordering. In embodiments, the order of the threads may not affect any order of execution of the threads 250. Instead, the ordering may be used by the threads to determine which operations may be performed by which threads, in order to facilitate effective redistribution of operations between threads, to achieve set-wise independence for the operations, and to facilitate parallel operation, as described below. In various embodiments, different threads may operate on various computer processor and/or core arrangements. For example, in various embodiments, different threads may operate on the same core of a processor, on different cores of a single processor, and/or on different cores of different computer processors.

In various embodiments, each of the threads 250 may be assigned explicitly or implicitly associated with, during runtime, a work set of B+ tree operations 260 which is particular to that thread 250. In various embodiments, each thread 250's assigned/associated work set of B+ tree operations 260 may be derived or identified from initial partitioned subsets of the batch or sequence of B+ tree operations 210. The work sets are set-wise independent, enabling them to be performed in parallel. In other words, the operations within a work set do not have dependence on any other operations outside the work set. Threads 250 may first respectively perform in parallel the assigned/associated work set of tree operations 260 on the leaf nodes of B+ tree 220. Each thread 250 may maintain or ensure the order of the operations 260 within its work set.

Thereafter, threads 250 may modify the internal nodes of B+ tree 220 to account for the effects of the tree operations performed on the leaf nodes. In various embodiments, the threads 250 may successively modify the internal nodes, one tree level at a time, starting from the tree level immediately above the leaf nodes, and move towards the root node. In various embodiments, the modification operations 265 on the internal nodes at each level may also be effectively organized into set-wise independent work sets, and performed by the threads in parallel.

While for ease of understanding, the work sets of tree operations 260 and node modification 265 are only shown for Thread 1, it should be understood that each thread 250 may be assigned/associated a work set of B+ tree operations 260 and a work set of node modifications 265. In various embodiments, as the node modifications move up B+ tree 220 from the internal nodes at the tree level immediately above the leaf nodes toward the root node, each thread may effectively redistribute node modifications with other threads to provide set-wise independence between the work sets, to enable their parallel performance.

In various embodiments, threads 250 may also be respectively allocated with retrieval buffers 268 for storing results of Retrieve operations. On completion of the B+ tree operations 210, one of the threads 250, or control thread 240 may perform a union of all the retrieved data stored in retrieval buffers 268 to generate the Retrieve output for the B+ tree operations 210 on B+ tree 220. In various embodiments, the per-thread retrieval buffers 268 may be allocated in cache or system memory, or in mass storage.

Figure 3:
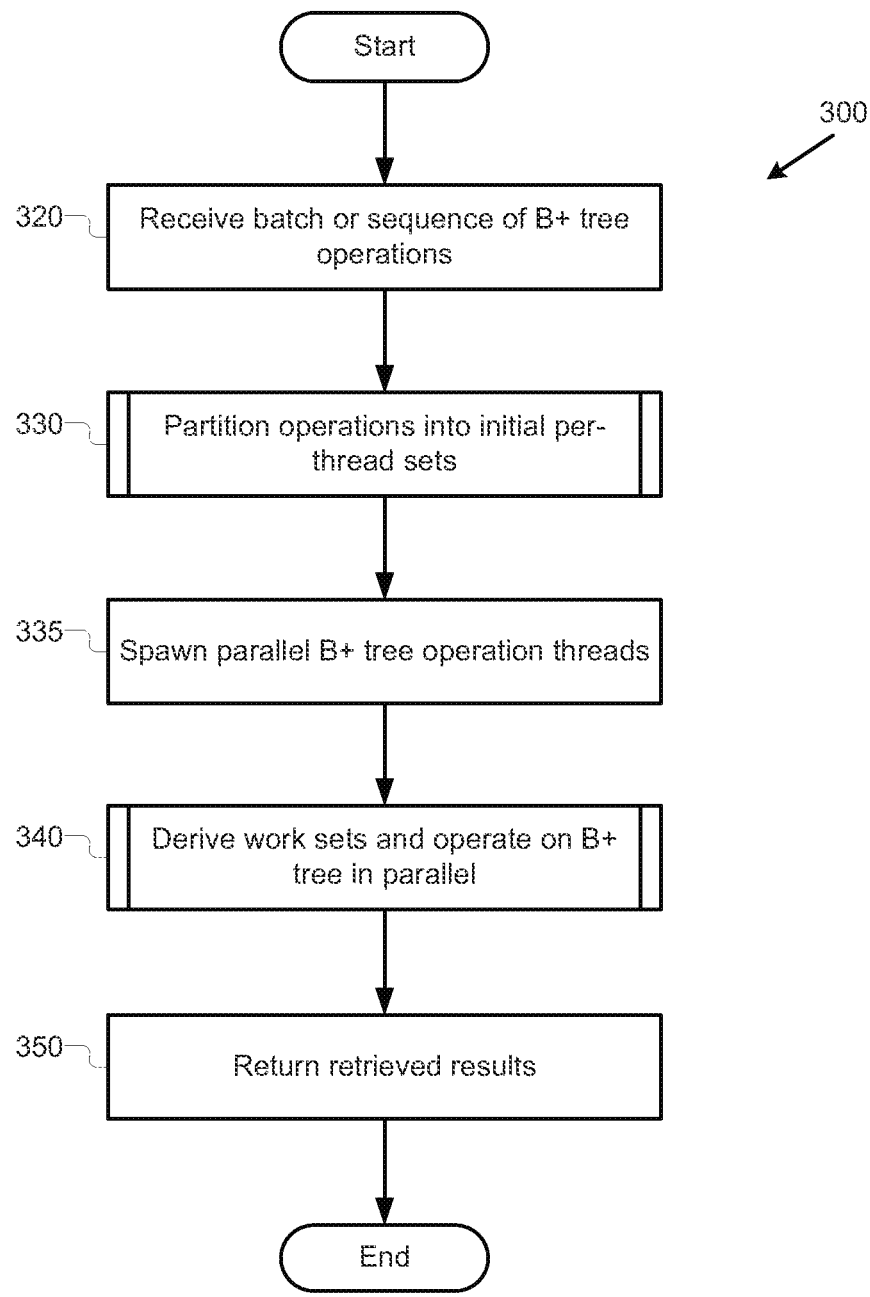
FIG. 3 illustrates an example multi-threaded B+ tree operation process, in accordance with various embodiments.

FIG. 3 illustrates an example multi-threaded B+ tree operation process 300, in accordance with various embodiments. In various embodiments, one or more operations of process 300 may be reordered, removed, or split into further operations. In various embodiments, the process may be performed with relation to a B+ tree, such as B+ tree 220. The process may begin at operation 320, where a batch or sequence of ordered B+ tree operations, such as batch or sequence of ordered B+ tree operations 210, may be received.

Next, at operation 330, the ordered operations may be partitioned into initial per-thread sets, (e.g., $p_1, p_2, \ldots p_n$), from which the set-wise independent work sets 260 may be derived later. Next, at operation 335, the control thread 240 may spawn one or more parallel B+ tree operation threads 250 for parallel performance of the per-thread sets of B+ tree operations.

Next, at operation 340, each of the threads 250 may derive their respective set-wise independent work sets from the initial partition sets in parallel. In various embodiments, the threads have thread identifiers, (e.g., $t_1, t_2, \ldots, t_n$), and are ordered by the thread identifiers. A thread $t_i$ may derive its set-wise independent work set by first identifying the leaf nodes operated on by the operations in initial partition set $p_i$, but excluding the leaf nodes also identified by other threads with lower thread order, (e.g., $t_1, \ldots t_{i-2}, t_{i-1}$). The set-wise independent work set of operations for thread $t_i$ are those operations associated with the remaining leaf nodes. The operations associated with the excluded leaf nodes are effectively re-distributed to other threads. In implementations, the work sets may or may not be actually created. In various embodiments, the initial identifications may be performed by the threads in parallel. The threads may then sync up before checking, in parallel, whether any of the identified leaf nodes are also identified by threads of lower thread order, and therefore should be excluded. On derivation or identification of the respective set-wise independent work sets, the threads may perform the operations in the work set, and operate on the leaf node of B+ tree in parallel. Further examples of operation 340 are also described below.

Finally, at operation 350, the multi-threaded B+ tree processing module 200 may perform a union of the retrieved results stored in the retrieval buffers 268 of the various threads 250, and return the combined results as the retrieval results of the Retrieve operations operated on the B+ tree. Therefore, the process may then end.

Figure 4:
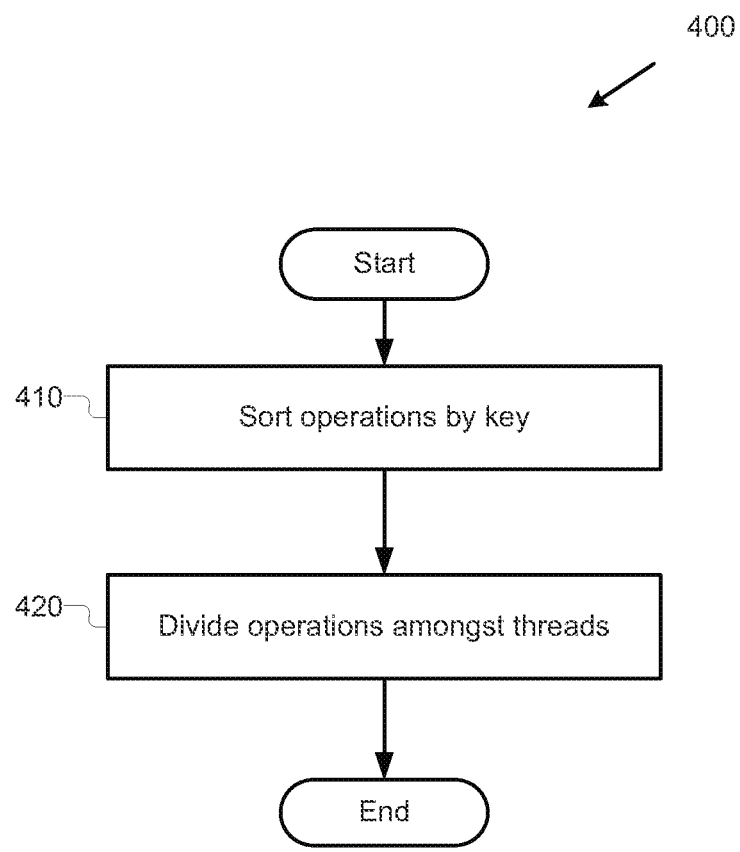
FIG. 4 illustrates an example multi-threaded B+ tree operation partitioning process, in accordance with various embodiments.

FIG. 4 illustrates an example multi-threaded B+ tree operation partitioning process 400, in accordance with various embodiments. In various embodiments, the partitioning may be performed by the control module 245 executing as the control thread 240. Further, in various embodiments, one or more operations of process 400 may be reordered, removed, or split into further operations. The process may begin at operation 410, where operations from the batch or sequence of ordered B+ tree operations 210 may be sorted by key. In various embodiments, this sorting may simplify later effective redistribution of tree operations and node modifications to achieve set-wise independence for the various working sets, as described below. In various embodiments, the order of operations within the batch or sequence of ordered B+ tree operations 210 may be maintained or ensured on a per-key basis after the sorting. Thus, even after operation 410, each B+ tree operation that is to be performed for a given key k may still be in the same relative order they were in the batch or sequence of ordered B+ tree operations 210. This maintenance of the original per-key order of the B+ tree operations may be useful to ensure that results are consistent with those expected if each operation in the batch were performed in their original order.

Next, at operation 420, the B+ tree operations from the batch or sequence 210 may be divided initial into partitioned subsets, (e.g., $p_1, p_2, \ldots, p_n$). In various embodiments, n is an integer and equals to the expected number of threads to be employed for the parallel operations. In various embodiments the partitioning may be performed by the control thread 240. In some alternative embodiments, the threads 250 themselves may perform the initial partitioning instead, such as by selecting a pre-determined number of B+ tree operations from the batch 210, (e.g., a pre-determined number that provides the threads initially with an approximately equal number operations). In various embodiments, throughout the partitioning, the B+ tree operations may be kept in order, at least on a per-key basis. Again, this maintenance of the original per-key order of the B+ tree operations may be useful to ensure that results are consistent with those expected if each operation in the batch were performed in their original order. The process may then end.

Figure 5:
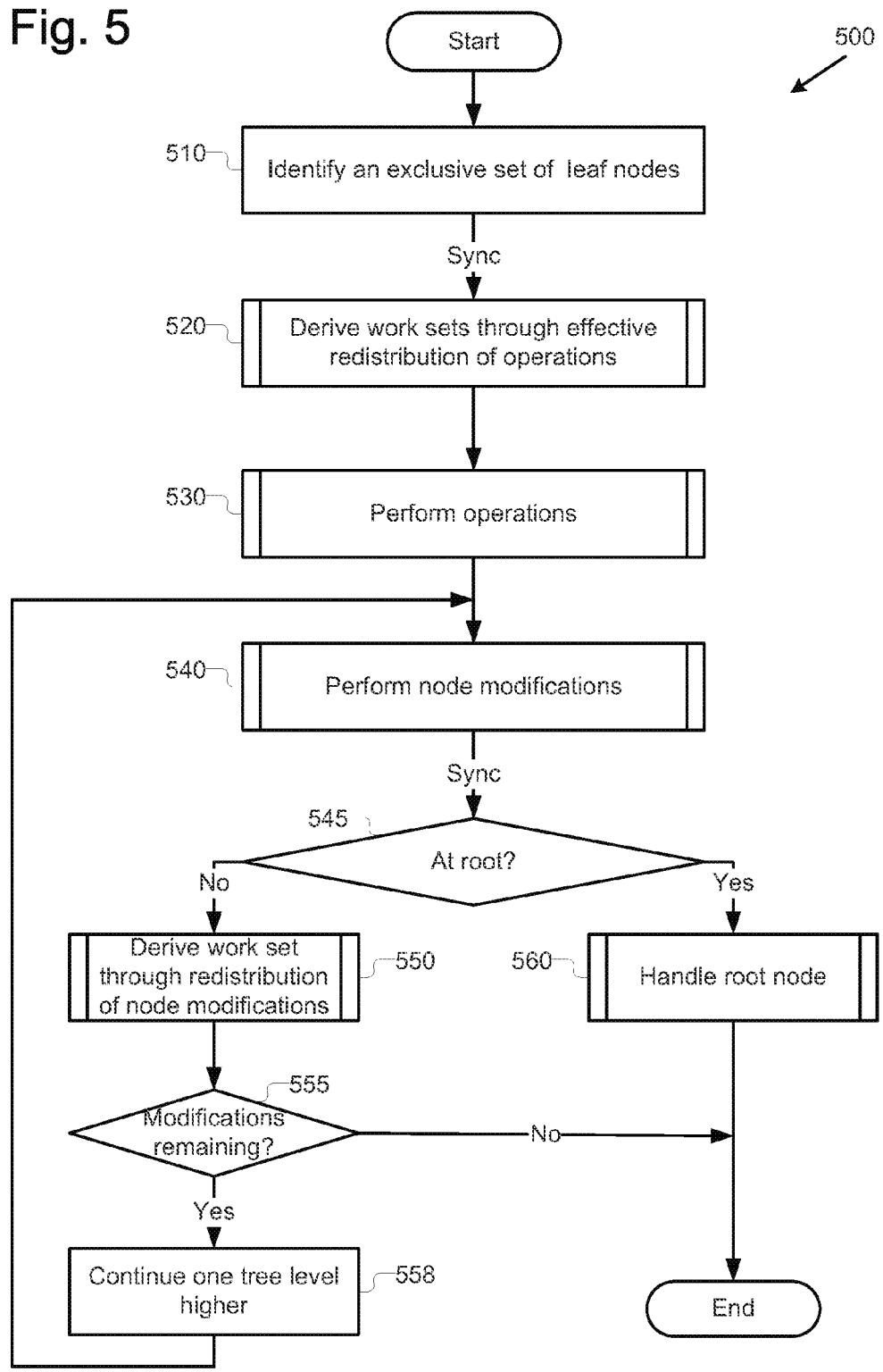
FIG. 5 illustrates an example multi-threaded B+ tree parallel operation process, in accordance with various embodiments.

FIG. 5 illustrates an example multi-threaded B+ tree parallel operation process 500, in accordance with various embodiments. In various embodiments, the process 500 may be performed by a thread 250, an executing instance of tree operation module 255. In various embodiments, one or more operations of process 500 may be reordered, removed, or split into further operations. In various embodiments, the operations of process 500 may be performed in parallel by multiple threads 250. By operating in parallel, in various embodiments the threads may perform the totality of the B+ tree operations in the batch of B+ tree operations 210.

The process may begin at operation 510 where the thread 250 ($t_i$) may identify an exclusive set of leaf nodes it is responsible for. The thread 250 ($t_i$) may search the B+ tree 220 for an initial set of leaf nodes ($L_i$) which hold keys corresponding to the operations from its assigned/associated initial partition set ($p_i$) of B+ tree operations 260. In various embodiments, operation 510 may include an iterative search by the thread 250 ($t_i$) of each of the keys indicated in its assigned/associated initial partition ($p_i$) set of operations. In various embodiments, the search of operation 510 may be performed iteratively and without reference to order, because, any search results reflect a state of the tree when the batch of operations was dispatched, because no modifications have yet occurred to the B+ tree 220. In various embodiments, the thread 250 ($t_i$) may, after performing the search, wait for other executing threads to complete their search (referred to in FIG. 5 as a "sync"). This sync may, in various embodiments, allow the threads 250, which are operating in parallel, to all be at the same stage before proceeding with other operations.

Next, at operation 520, the thread 250 ($t_i$) may derive its set-wise independent working set ($ws_i$) through effective redistribution of operations. As described earlier, after the threads 250 ($t_i$) have obtained the initial set of leaf nodes ($L_i$), the threads 250 ($t_i$) may exclude the leaf nodes also identified by other threads with lower thread order, (e.g. $t_1, \ldots t_{i-2}, t_{i-1}$). The set-wise independent work set ($ws_i$) of operations for the thread 250 $t_i$ are the operations associated with the remaining leaf nodes. In various embodiments, those threads 250 that do not keep any B+ tree operations after redistribution may cease execution (not illustrated). Further examples of operation 520 are described below.

Next, at operation 530, the thread 250 may perform operations from its set-wise independent work set of B+ tree operations on the B+ tree, in parallel with the other threads, like performing operations from their respective set-wise independent work sets of B+ tree operations on the B+ tree. Further examples of operation 530 are described below.

The thread 250 may then continue to operation 540, where node modifications may be performed. In various embodiments, these node modifications may be kept in the thread's set of node modifications 265. Further examples of operation 540 are described below. In various embodiments, the thread 250 may, after performing the node modifications, wait for other executing threads to complete their node modifications (referred to in FIG. 5 as a "sync"). This sync may, in various embodiments, allow the threads 250, which are operating in parallel, to all be at the same stage before proceeding with other operations.

At decision operation 545, the thread 250 may determine if it is operating on the root node of the B+ tree. If the thread is operating on the root node, then the thread may continue to operation 560 to handle the root node of the B+ tree. Further examples of operation 560 are described below. The process may then end.

If, however, the thread is not operating on the root node, the thread may continue to operation 550, where the thread 250 may derive a set-wise independent work set of node modifications through effective redistribution of node modifications among the threads. Next, at decision operation 555, the thread 250 may determine, after derivation of the work set through redistribution, whether it still has node modifications in its set-wise independent work set of node modifications 265. If the work set of node modifications 265 for the thread 250 is now empty, then the thread may cease execution and the process may then end.

If, however, the thread 250 does have node modifications remaining in its work set of node modifications 265, then the thread 250 may continue to operation 558, where the thread may then continue to operate on the B+ tree one level higher. The thread may then repeat operation 540, and as well as operations 550 and 555 if it is still not at the root node. The thread 250 may continue this repetition, and may continue performing derivation of work set through effective redistribution, and node modification at successively higher levels of the B+ tree while it continues to have node modifications to perform at each level. As discussed earlier, in various embodiments this repetition may continue until the thread 250 either has no node modifications for a given next level, or reaches the root node. In various embodiments, through the parallel operation of process 500, the various threads 250 may operate over the B+ tree, from bottom (leaf nodes) to top (root node), performing operations, and then repeatedly modifying nodes, both in parallel, until the root node of the B+ tree is reached.

Figure 6:
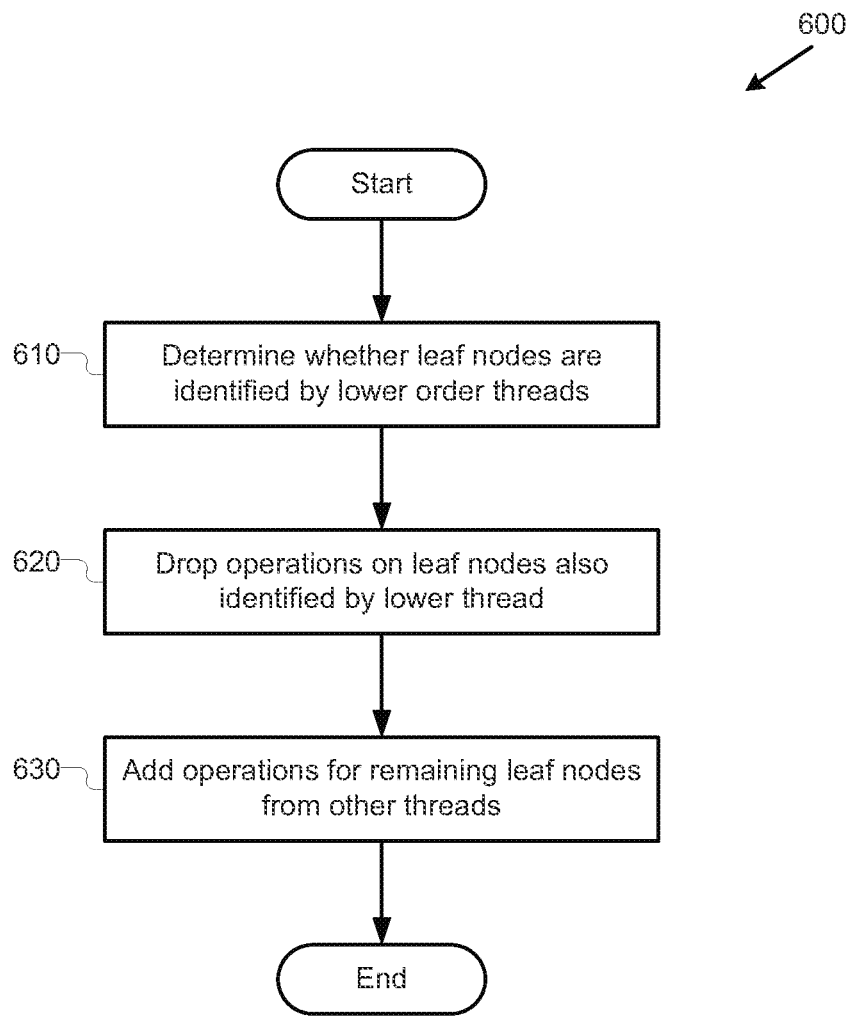
FIG. 6 illustrates an example multi-threaded B+ tree parallel operation effective redistribution process, in accordance with various embodiments.

FIG. 6 illustrates an example B+ tree operation effective redistribution process 600 in accordance with various embodiments. In various embodiments, the B+ tree operation effective redistribution may be performed by a thread 250 executing an instance of a tree operation module 255. In various embodiments, one or more operations of process 600 may be reordered, removed, or split into further operations.

In various embodiments, through execution of the operations of process 600, threads 250 may effectively redistribute operations at a given tree level based on the nodes that must be operated on or modified. By doing so, the threads 250 may ensure that each node is operated on or modified by exactly one thread, preventing contention between threads. Additionally, in various embodiments, by effectively redistributing based on nodes, process 600 may avoid the need for a lower-granularity-based distribution of operations. Since each operation may affect a single node, assignments or association of operations to threads 250 may be implied by the threads determining node ownership.

In various embodiments, each thread 250 i may determine a subset, here termed $L'_i$, of its initial set of leaf nodes, $L_i^d$. In one embodiment, the subset of leaf nodes may be determined by:

$$L'_i = \{\lambda \in L_i | \lambda \notin L_j \forall 0 \leq j < i\}.$$

In various embodiments, this may mean that a thread 250 ($t_i$) may keep a leaf node (and therefore operations for the leaf node) if no lower-ordered thread, (e.g., $t_1, \ldots t_{i-2}, t_{i-1}$), has identified that leaf node in their corresponding initial sets of leaf nodes. It may be helpful to recognize that, in various embodiments, the operations of process 600 are performed after each thread 250 has completed a search and has identified its initial set of leaf nodes, thereby allowing this comparison to derive the work set of leaf nodes.

Additionally, in various embodiments, the batch of B+ tree operations may be sorted by key value before partitioning and searching are done, as described above. Thus, the leaf nodes $L_i = \{l_0^i, l_1^i, \ldots\}$ that are identified during the search for a thread 250 may also be ordered from left to right in the tree. In particular, the leaf nodes may be ordered (by key) within each set of leaf nodes, and leaf nodes may also be ordered across threads.

Thus, at operation 610 where the thread 250 ($t_i$) may determine whether the leaf nodes in its initial set of leaf nodes are also identified by its lower order threads 250, $t_1, \ldots t_{i-2}, t_{i-1}$. Next, at operation 620, the thread 250 ($t_i$) may exclude the leaf nodes that are also identified by its lower order threads, effectively dropping those operations associated with the excluded nodes from in its work set of operations. Then, at operation 630, the thread 250) may likewise add operations from other threads 250 if those operations act on the remaining leaf nodes. By performing operations 620 and 630, the thread 250 may generate a set-wise independent work set of B+ tree operations for itself to perform in parallel with the other threads, respectively working on their set-wise independent work sets of operations. The process may then end.

In some embodiments of process 600, the threads 250 may each maintain their sets of identified leaf nodes in memory that is accessible by other threads 250. These embodiments may provide the threads 250 with the ability to inspect identified leaf nodes and effectively redistribute operations accordingly without requiring explicit communication between nodes. Further in various embodiments, the threads 250 may perform the effective dropping and adding of operations without explicit communications with each other. In various embodiments, these operations may be handled without explicit communication because each thread 250 follows the same process and because the threads do not begin effective distribution of operations until all searches have been completed. In various embodiments, throughout effective redistribution, B+ tree operations may be kept in order, at least on a per-key basis. This maintenance of the original per-key order of the B+ tree operations may be useful to ensure that results are consistent with expectations.

Figure 7A:
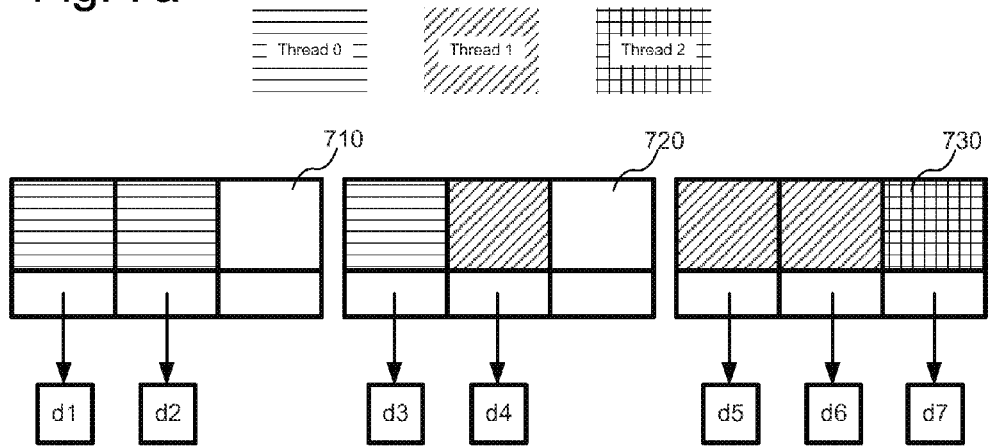
FIGS. 7a and 7b are block diagrams illustrating an example of effective redistribution of B+ tree operations amongst threads, in accordance with various embodiments.
Figure 7B:
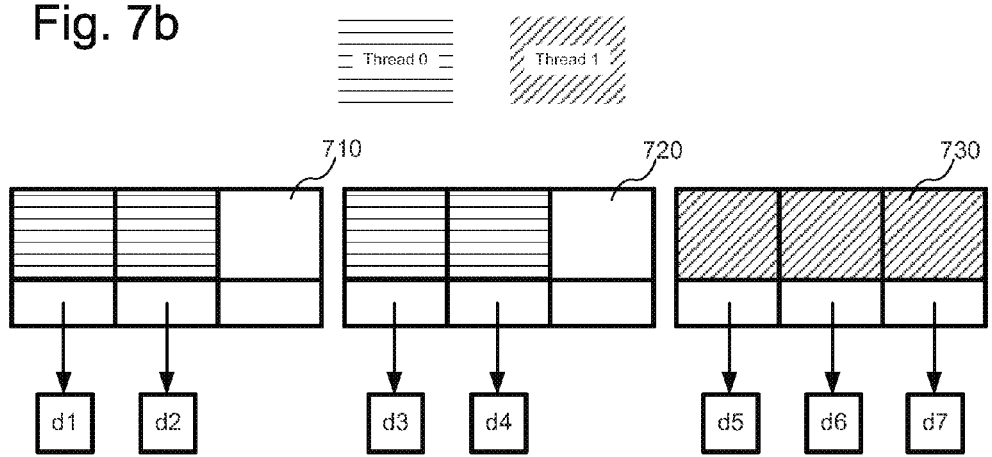

FIGS. 7a and 7b are block diagrams illustrating an example of effective redistribution of B+ tree operations amongst threads in accordance with various embodiments. FIGS. 7a and 7b show examples of two sets of three leaf nodes which contain keys for which operations are to be performed. In the example of FIG. 7a, three threads 250 have performed searches and have identified the initial set of keys for which they have B+ tree operations in their per-thread sets of B+ tree operations. Thread 0 has B+ tree operations on keys in leaf nodes 710 and 720. Thread 1 has B+ tree operations on keys in leaf nodes 720 and 730. And Thread 2 has B+ tree operations on keys in leaf node 730. It may be noted that, in the example provided, the threads are associated with contiguous keys in order across the leaf nodes. Some embodiments may exhibit this characteristic, particularly when operations are partitioned in key-order. However, in other embodiments, operations may be assigned to threads in different orders.

In the example of FIG. 7b, the threads 250 have each performed process 600 and have effectively redistributed the B+ tree operations accordingly. Thus, Thread 0 kept its B+ tree operations for keys in leaf node 710, because it is the lowest order thread. Additionally, because Thread 0 had one or more operations on a key in leaf node 720, it took the remaining operations on keys in that leaf node away from Thread 1. Similarly, because Thread 1 had one or more operations on a key in leaf node 730, it took the remaining operations on keys in that leaf node away from Thread 2. Thread 2 has no operations left in this example, and thus would end early.

Figure 8:
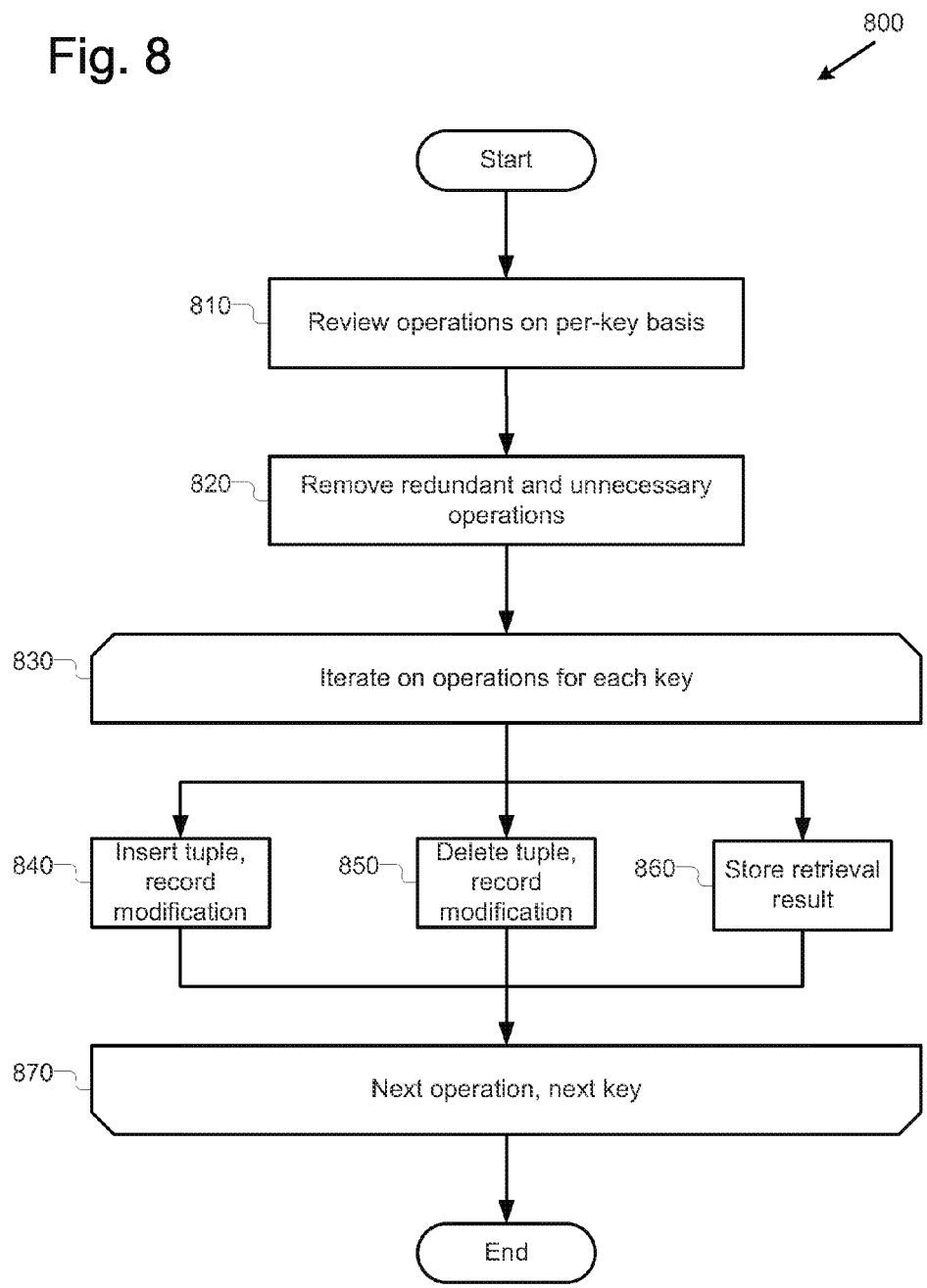
FIG. 8 illustrates a further example multi-threaded B+ tree parallel operation performance process, in accordance with various embodiments.

FIG. 8 illustrates a further example B+ tree parallel operation performance process 800, in accordance with various embodiments. In various embodiments, the performance of B+ tree operations may be performed by a thread 250 executing an instance of a tree operation module 255. In various embodiments, one or more operations of process 800 may be reordered, removed, or split into further operations. The process may begin at operation 810, where each of the B+ tree operations in the thread 250's work set of B+ tree operations 260 may be reviewed on a per-key basis without reference to other keys. Next, at operation 820 redundant and/or unnecessary operations may be removed from the set of operations for each key. For example, if an Insert operation is followed by a Delete with no intervening Retrieve, then the Insert and Delete operations may be safely removed, as they will have no effect on the tree or on any results. Similarly, if a work set of B+ tree operations 260 includes successive Insert operations for a particular key without intervening Delete operations for the key, one or more of the Insert operations may be removed.

Next, at operation 830, the thread 250 may iterate on operations in its work set of B+ tree operations for each key and perform B+ tree operations. Thus, in various embodiments, and for various keys, the thread 250 may perform an Insert operation at operation 840, where a tuple is inserted, as described above. Further, if a new key is to be inserted into the B+ tree because of the Insert, a node modification to insert the key may be recorded at this time.

In various embodiments, and for various keys, the thread may perform a Delete operation at operation 850, where a tuple is deleted, as described above. Further, if a key is to be deleted from the B+ tree because of the Delete operation, a node modification to delete the key may also be recorded at this time. In various embodiments, and for various keys, the thread 250 may perform a retrieve operation at operation 860, where a result may be retrieved based on a key and stored in a retrieval buffer 268 for later returning by the thread 250. As described earlier, the contents of these retrieval buffers may later be combined and returned by the multi-threaded B+ tree processing module 200, as described above. At operation 870, the thread 250 may continue, iterating on the next operation for the key, and after each operation for the key is complete, for operations for the next key. Then process may then end.

It may be noted that B+ tree operations may be performed on a per-key basis because B+ operations on distinct keys are independent of one another with respect to the state of the database D. Thus, the multi-threaded B+ tree processing module 200 may examine operations affecting each key independently. Furthermore, in various embodiments, all B+ operations on a given key are tied to a single leaf node and this leaf node will be modified by only a single thread 250. In various embodiments, different orders of operations may be observed.

Figure 9:
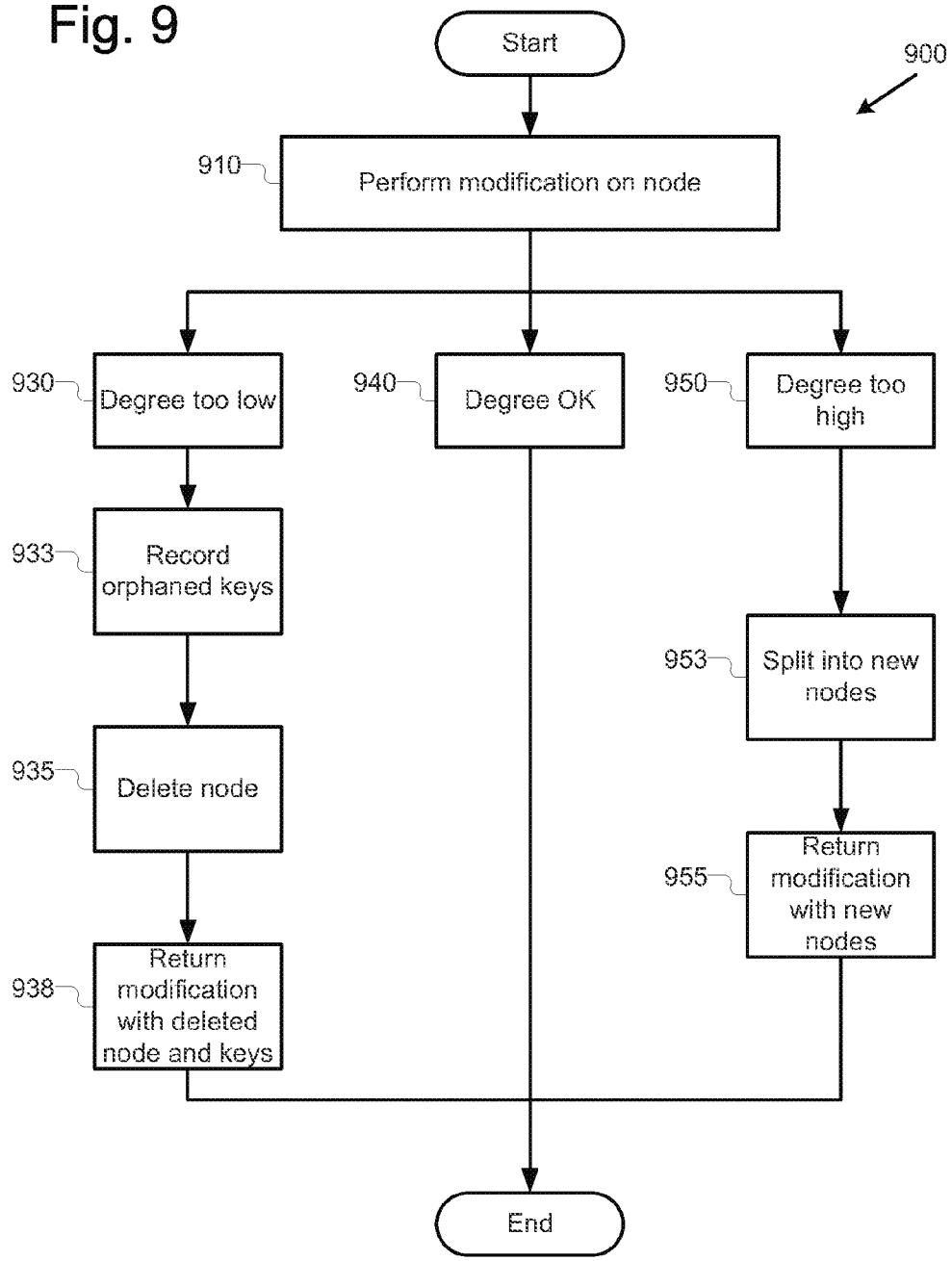
FIG. 9 illustrates an example multi-threaded B+ tree parallel node modification process, in accordance with various embodiments.

FIG. 9 illustrates an example B+ tree parallel node modification process 900 in accordance with various embodiments. In various embodiments, the node modification may be performed by a thread 250 executing an instance of a tree operation module 255. In various embodiments, one or more operations of process 900 may be reordered, removed, or split into further operations. In various embodiments, node modifications may be performed on various levels of a B+ tree, as described above. Thus, node modifications may stem directly from Insertions or Delete operations made on leaf nodes, or may be based on lower-level modifications that have been propagated up from lower level nodes to internal nodes at a particular level.

The process may begin at operation 910, where the thread 250 may perform node modifications in accordance with its set-wise independent work set of node modifications. Next, in various embodiments, one of operation 930, 940, or 950 may be performed depending on the outcome of the node modification on the degree of the node (e.g., the number of elements in the node).

Thus, if the degree is lower than a lower limit at operation 930, such as from a Delete operation resulting in a node that has too few children, then operations 933, 935, and 938 may be performed. At operation 933, the thread 250 may record any keys that are to be orphaned by deleting of the node that has too-low a degree. These recorded orphaned keys may be added back into the B+ tree at a later point, as described below. At operation 935, the node may be deleted. At operation 938, the thread 250 may create a node modification to be applied at a higher tree level showing the node has been deleted. The node modification may include the list of newly-orphaned keys.

Similarly, if the degree of the modified node is higher than an upper limit at operation 950, such as from an Insert operation resulting in a node that has too many children, then operations 953 and 955 may be performed. At operation 953, the thread 250 may split the modified node into two or more new nodes. Then, at operation 955, the thread 250 may return a node modification to be applied at a higher tree level showing the node has been split. The node modification may include indications of the newly-created nodes.

In either case of too-high or too-low a degree, the returned modification may then be used at a higher level of the B+ tree, such as by repeating process 900 at a higher level of the tree. This repetition may be performed in order that modifications may be propagated up the B+ tree. Finally, if the degree of the modified node is within the upper and lower limits at operation 940, then, in various embodiments no further node modification operations occur in that thread at that level of the tree. Process 900 may then end.

Figure 10:
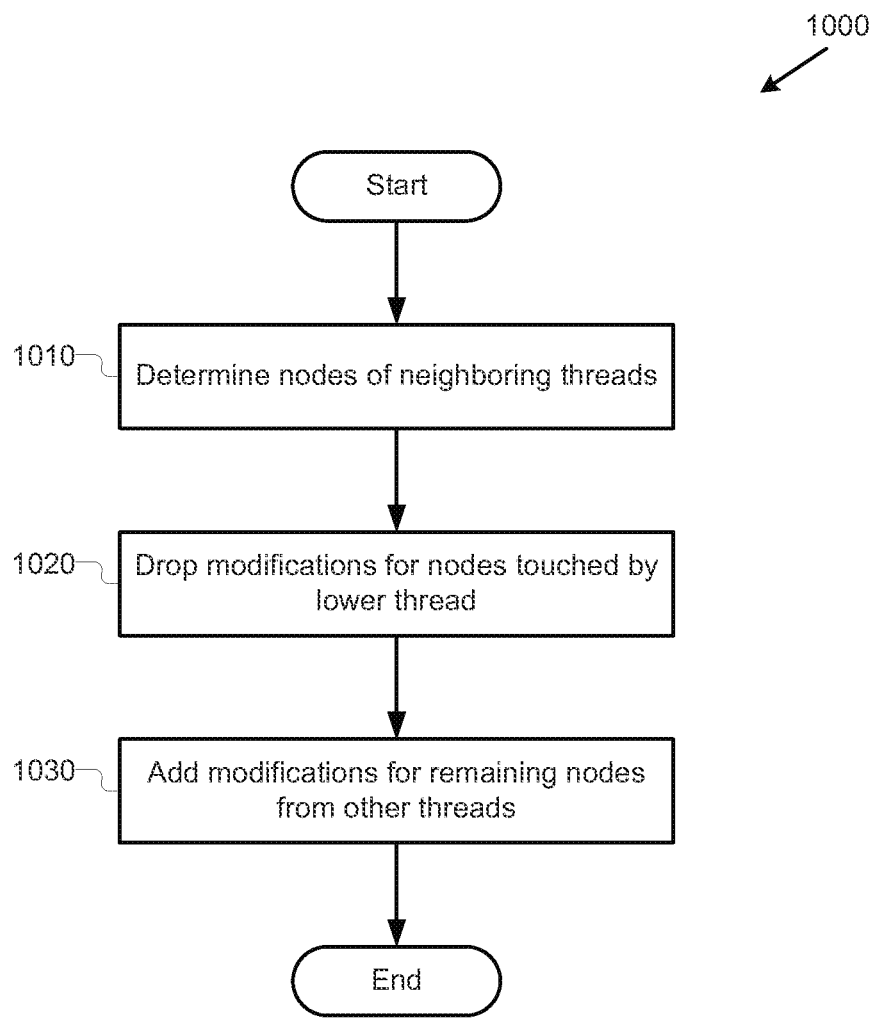
FIG. 10 illustrates an example multi-threaded B+ tree parallel node modification effective redistribution process, in accordance with various embodiments.

FIG. 10 illustrates an example B+ tree parallel node modification effective redistribution process 1000 in accordance with various embodiments. In various embodiments, the effective B+ tree node modification redistribution may be performed by a thread 250 executing an instance of a tree operation module 255. In various embodiments, one or more operations of process 1000 may be reordered, removed, or split into further operations.

In various embodiments, through execution of the operations of process 1000, threads 250 may effectively redistribute node modifications at a given tree level based on the nodes that must be modified for the given tree level. By doing so, the threads 250 may ensure that each node is modified by exactly one thread, preventing contention between threads.

In various embodiments, at a tree level d, each thread 250 i may determine a work subset, here termed $M_i^{d\prime}$, from its initial set of nodes to be modified at that level, $M_i^d$. In one embodiment, the work subset of nodes may be determined by:

$$M_i^{d\prime} = \{\mu \in M_i^d | \mu \notin M_j^d \forall 0 \leq j < i\}.$$

In various embodiments, this may mean that a thread 250 may keep modifications for a node if no lower-ordered thread has any modifications for that node. It may be noted that this work subset of nodes is selected similarly to how work sets of leaf nodes are selected in process 600.

The process may begin at operation 1010 where the thread may determine the nodes to be modified by the lower order threads. Next, at operation 1020, the thread 250 may drop those node modifications in its initial set of node modifications which are associated with nodes owned by the lower order threads. Then, at operation 1030, the thread 250 may likewise add node modifications from other threads 250 if those node modifications act on remaining nodes of the thread 250. By performing operations 1020 and 1030, the thread 250 may generate a set-wise independent work set of node modifications for itself to perform in parallel with other threads respectively performing their work sets of node modifications. The process may then end.

Figure 11:
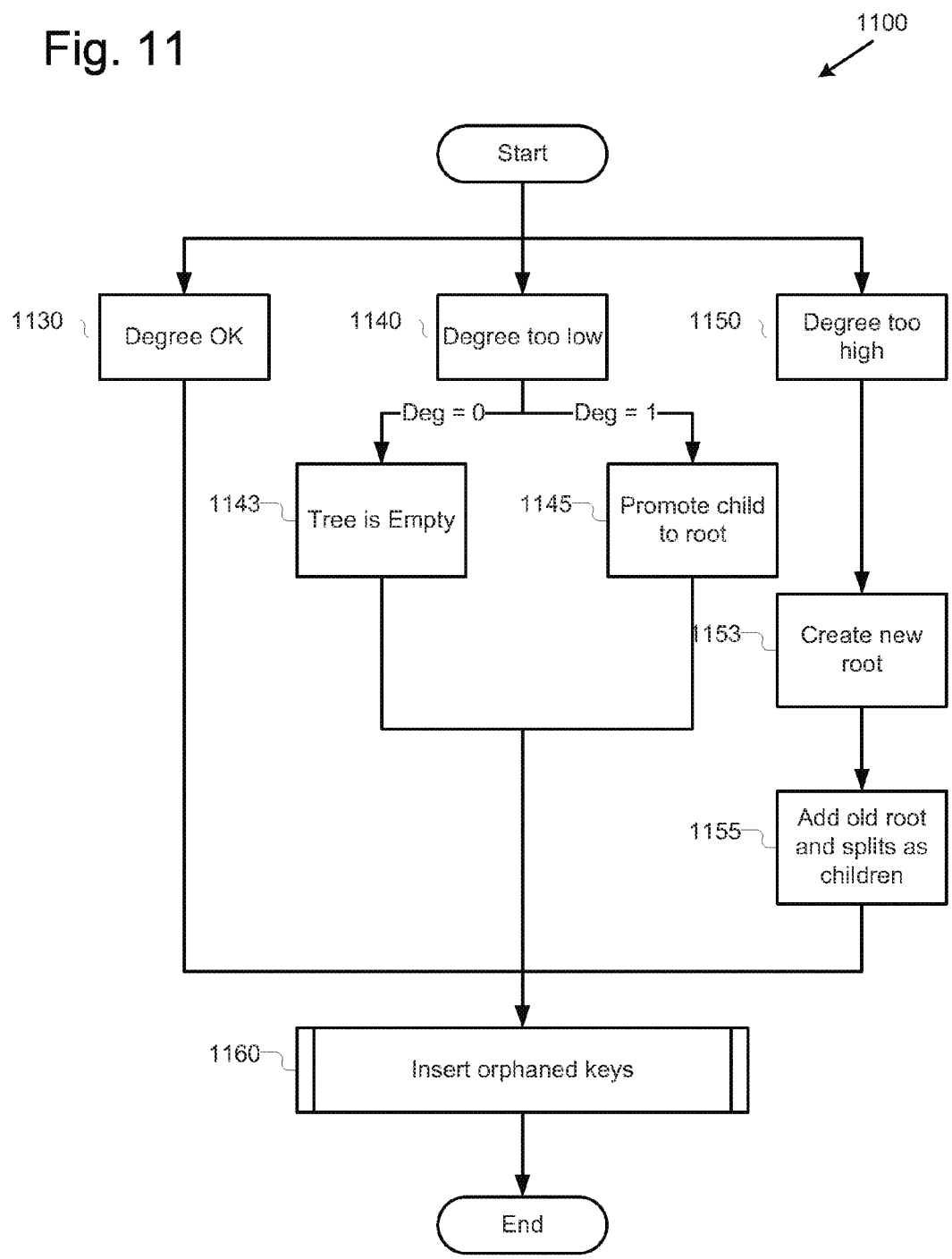
FIG. 11 illustrates an example multi-threaded B+ tree root handling process, in accordance with various embodiments.

FIG. 11 illustrates an example B+ tree root handling process 1100 in accordance with various embodiments. In various embodiments, the B+ tree root handling process 1100 may be performed by a thread 250 executing an instance of a tree operation module 255 or a control thread of a control module of tree operation module 255. In various embodiments, one or more operations of process 1100 may be reordered, removed, or split into further operations. It may be noted that, in various embodiments, process 1100 may be performed after modifications have already been performed on the children of the root node, such as in process 900. Thus, process 1100 may be performed to do final modifications on the root node and to clean up the B+ tree. The process may begin where, in various embodiments, one of operation 1130, 1140, or 1150 may be performed depending on how modifications to the root node's children affect the degree of the root node.

Thus, if the degree is lower than a lower limit at operation 1140, such as from the root node having too few children, then operation 1143 or 1145 may be performed. At operation 1143, which may be performed if the degree of the root is 0, the tree may be determined to be empty. At operation 1145, which may be performed if the degree of the root is 1, the thread may promote the sole child of the root as the new root of the B+ tree.

Similarly, if, the degree of the modified node is higher than an upper limit at operation 1150, such as from the root node having too many children, then operations 1153 and 1155 may be performed. At operation 1153, the thread may create a new root node. Then, at operation 1155, the thread 250 may add the old root node as a child, along with the outstanding split internal nodes that were children of the old root node.

In either case of too-high or too-low a degree, or in the case where the degree of the modified root node is within the lower and upper limits at operation 1130, operation 1160 may be performed. At operation 1160, the orphaned keys which have been recoded and maintained as operation processing has continued up the tree may be added back into the B+ tree. In various embodiments, the keys may be added back in through one or more Insert operations. In various embodiments, operation 1160 may include a re-execution of the entire parallel B+ tree operation performance process described herein, using a list of Inserts for the orphaned keys as the input batch of B+ tree operations 210. However, because this new batch may include only Insert operations, in various embodiments the second execution of the process may end without any Deleted keys. As such, there may be no need for a third execution of the process. Process 1100 may then end.

In various embodiments, one or more of the processes described above may be implemented using software. In some implementations, the operations of the threads 250 may be described by the following example parallel B+ tree implementation, which is presented in pseudo-code. The example implementation is illustrated as taking input: 0, a batch or sequence of ordered B+ tree operations; $T_D$, a B+ tree; i, the ID of the thread that is executing the implementation; and t, the number of executing threads 250:

```
Parallel B+Tree Implementation (O,T_D,i,t)
1       O_i = PARTITION- INPUT (O,i,t)
2       L_i = SEARCH(O_i,T_D)
3       SYNC(i,t)
4       L_i' = REDISTRIBUTE- WORK(L_0,...,L_{t-1},i)
5       R_i,O_{Li'} = RESOLVE- HAZARDS(L_i',O,D)
6       for (O_λ,λ) in (O_{Li'},L_i')
7           M_i^1-M_i^1 ∪ MODIFY- NODE(O_λ,λ)
8       SYNC(i,t)
9       for d = 1 to depth(T_D)-1
10          M_i^{d'} = REDISTRIBUTE- WORK(M_0^d,...,M_0^d,i)
11          for (Λ,η) in M_i^{d'}
12              M_i^{d+1}-M_i^{d+1} ∪ MODIFY- NODE(Λ,η)
13          SYNC(i,t)
14          if i == 0
15              HANDLE- ROOT (∪M_i^{d+1},T_D)
16      return R_o,...,R_{t-1}
```

In various embodiments, the one or more of the processes described above may be implemented by portions of this code. Thus, at line 1, the operations may be initially partitioned amongst the threads. In various embodiments, this partitioning may be performed in parallel by each thread 250, as illustrated; in other embodiments, a control thread may perform the partitioning. At line 2, the B+ tree may be searched to determine, for the thread, an initial set of leaf nodes that will be operated on by that thread. At line 3, the thread may wait in a Sync operation for other threads to complete their own searches. Next, at line 4, the thread may generate a set-wise independent work set operations through effective redistribution of its operations with other threads, based on the remaining identified leaf nodes, as described above. At line 5, the thread may reorder and perform operations in its work list of operations. Then, at lines 6 and 7, the thread may modify internal nodes at a tree level above the leaf nodes based on the operations it has performed on the leaf nodes, and it may wait at line 8 for other threads to finish their own node modifications for this immediate next higher level. At lines 9-13, the thread may perform a loop as it rises up the tree. Thus, at line 10, the thread may perform effective redistribution of its node modifications with other threads to achieve set-wise independent work sets of node modifications, as described above. At line 11 and 12, the thread may perform node modifications at a higher level of the tree, and at line 13, the thread may wait for other threads to finish their own node modifications. After the loop is completed, at lines 14 and 15 the thread may handle the root node. Finally, at line 16, the thread may return any retrieved results.

Additionally, in some implementations, the operations of the threads 250 in performing the MODIFY-NODE function listed in the pseudo-code above may be described by the following example MODIFY-NODE function implementation, which is presented in pseudo-code. The example implementation is illustrated as taking input: a node η and Λ, a sequence of modifications to the node. In various embodiments, if η is internal, Λ may represent a modification list. In various embodiments, if η is a leaf node, Λ may represent a series of Insert and Delete operations.

```
MODIFY- NODE(Λ,η)
1      E = items(η)
2      K = Ø
3      for m in Λ
4          K = K ∪ orphaned- keys(m)
5          if class(m) == +
6              E = E ∪ items(m)
7          elseif class(m) == −
8              E = E\items(m)
9      if |E| > MAX- DEGREE
10         η,η',η'',... = BIG- SPLIT(E)
11         return {+, parent(η),η,η',η'',...,K}
12     elseif |E| < MIN- DEGREE
13         return {−,parent(η),η,K ∪ descendant- keys(E)}
14     else
15         child- ranges(η) = E
16         return {Ø,K}
```

In various embodiments, the one or more of the processes described above may be implemented by portions of this code. Thus, at line 1 a set E of items in the node may be created, and at line 2 an (initially empty) set K of deleted keys may be created. At lines 3-8 a loop is run for each modification in the list Λ: at line 4, the set K may have deleted keys from each of the modifications in Λ added to it. At lines 5 and 6, if the modification is to add nodes, nodes are added to the items in the node η. At lines 7 and 8, if the modification is to delete nodes, nodes are removed from the items in the node η. Then, if η has too many children at line 9, a BIG-SPLIT function may be performed at line 10 to create one or more new nodes and divide the B+ tree node items E between the original node and new ones. Then at line 11, the resulting nodes from the split may be returned as a new node modification to the parent of the node η.

If, however, η has too few children at line 12, then, at line 13, a deletion modification may be returned as a new node modification to the parent of the node η, along with all of the deleted keys generated during the execution of the MODIFY-NODE function, and any returned from lower-level node modifications. If η has a proper number of children, then at line 15, the range of children of η may be set according to the current children of η and at line 16 the function may return.

Figure 12:
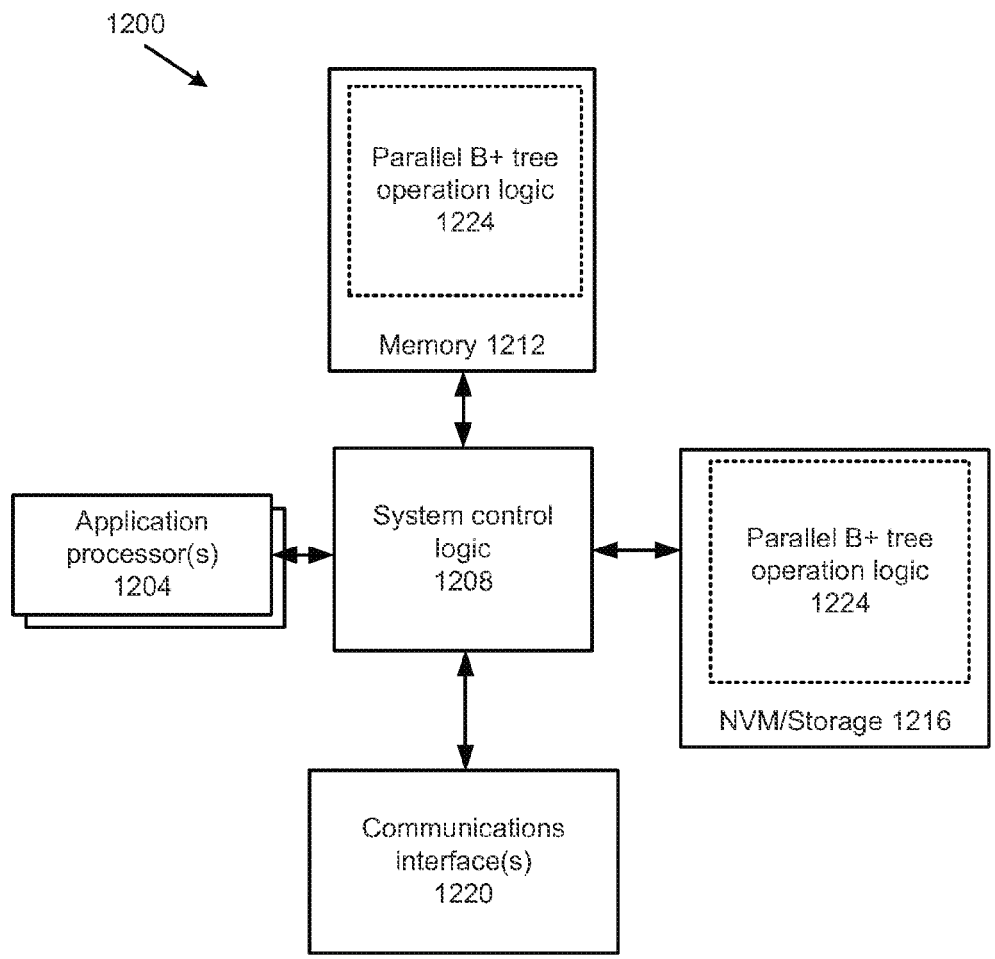
FIG. 12 illustrates an example computing environment, in accordance with various embodiments.

The techniques and apparatuses described herein may be implemented into a system using suitable hardware, firmware, and/or software to configure as desired. FIG. 12 illustrates, for one embodiment, an example system 1200 including at least processors 1204, each having one or more processor cores, system control logic 1208 coupled to at least one of the processors 1204, memory 1212 coupled to system control logic 1208, non-volatile memory (NVM)/storage 1216 coupled to system control logic 1208, and one or more communications interface(s) 1220 coupled to system control logic 1208. In various embodiments, the system 1200 may include components of a CPU-based software system, a management engine system, or a combination of the two.

System control logic 1208 for one embodiment may include any suitable interface controllers to provide for any suitable interface to at least one of the processors 1204 and/or to any suitable device or component in communication with system control logic 1208. The processors may include a dedicated application processor upon which an application environment may be operated, as well as a separate service processor upon which a manageability engine may be operated. The system may include additional processors or processing cores (not illustrated).

System control logic 1208 for one embodiment may include one or more memory controller(s) to provide an interface to memory 1212. System memory 1212 may be used to load and store data and/or instructions, for example, for system 1200. System memory 1212 for one embodiment may include any suitable volatile memory, such as suitable dynamic random access memory (DRAM), for example.

System control logic 1208 for one embodiment may include one or more input/output (I/O) controller(s) to provide an interface to NVM/storage 1216 and communications interface(s) 1220.

NVM/storage 1216 may be used to store data and/or instructions, for example. NVM/storage 1216 may include any suitable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s), for example.

The NVM/storage 1216 may include a storage resource physically part of a device on which the system 1200 is installed or it may be accessible by, but not necessarily a part of, the device. For example, the NVM/storage 1216 may be accessed over a network via the communications interface(s) 1220.

Memory 1212 and NVM/storage 1216 may include, in particular, temporal and persistent copies of logic, respectively. In the illustrated example, this logic may include parallel B+ tree operation logic 1224. The parallel B+ tree operation logic 1224 may include instructions that, when executed by at least one of the processors 1204, result in the system 1200 performing parallel B+ tree operation in conjunction with the modules described herein. In some embodiments, the parallel B+ tree operation logic 1224 may additionally/alternatively be located in the system control logic 1208.

Communications interface(s) 1220 may provide an interface for system 1200 to communicate over one or more network(s) and/or with any other suitable device. Communications interface(s) 1220 may include any suitable hardware and/or firmware. Communications interface(s) 1220 for one embodiment may include, for example, a network adapter, a wireless network adapter, a telephone modem, and/or a wireless modem. For wireless communications, communications interface(s) 1220 for one embodiment may use one or more antenna(s).

For one embodiment, at least one of the processor(s) 1204 may be packaged together with logic for one or more controller(s) of system control logic 1208. For one embodiment, at least one of the processor(s) 1204 may be packaged together with logic for one or more controllers of system control logic 1208 to form a System in Package (SiP). For one embodiment, at least one of the processor(s) 1204 may be integrated on the same die with logic for one or more controller(s) of system control logic 1208. For one embodiment, at least one of the processor(s) 1204 may be integrated on the same die with logic for one or more controller(s) of system control logic 1208 to form a System on Chip (SoC).

In various embodiments, system 1200 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A computer-implemented method comprising:
   receiving, by a control task operated by one or more processor cores, a sequence of ordered operations to be performed on a B+ tree;
   partitioning, by the control task, the sequence of ordered operations to generate a plurality of initial subsets of the ordered operations to be respectively associated with a plurality of threads operated by the one or more processor cores;
   redistributing the ordered operations of the plurality of initial sets among the plurality of initial sets, by the plurality of threads, to identify a plurality of set-wise independent work sets of operations to be set-wise respectively performed on leaf-nodes of the B+ tree in parallel by the threads;
   performing in parallel, by the corresponding plurality of threads, the plurality of set-wise independent work sets of operations on the leaf nodes of the B+ tree; and
   modifying, by at least the plurality of threads, internal nodes of the B+ tree to account for effects of the operations performed on the leaf nodes of the B+ tree.

2. The method of claim 1, wherein redistributing the ordered operations of the plurality of initial sets among the plurality of initial sets to identify a plurality of set-wise independent work sets of operations comprises, the respective threads:
   respectively searching the B+ tree, using the respective initial sets of operations to respectively identify and generate a plurality of initial sets of leaf nodes for the threads to respectively perform operations on; and
   respectively generating a plurality of work sets of leaf nodes, based at least in part on the plurality of initial sets of leaf nodes, by respectively selecting leaf nodes in corresponding sets of the plurality of initial sets of leaf nodes;
   wherein:
   the threads have corresponding thread identifiers that are ordered;
   the leaf nodes selected from a corresponding initial set by a particular thread are leaf nodes not in any initial sets corresponding to threads with thread identifiers that are lower than the thread identifier of the respective thread; and
   the set-wise independent work sets of operations are subsets of the sequence of ordered operations correspondingly associated with the work sets of leaf nodes.

3. The method of claim 1, wherein modifying comprises:
   successively modifying, by the threads, internal nodes of the B+ tree, one tree level at a time, for all internal nodes of all tree levels below a root node; and
   modifying thereafter, by one of the threads or a control task, the root node.

4. The method of claim 3, wherein modifying internal nodes of a tree level immediately above the leaf nodes comprises:
   identifying in parallel, by the threads, a plurality of initial sets of modification operations that need to be made to the internal nodes of the tree level immediately above the leaf nodes, to account for effects of the operations performed on the leaf nodes of the B+ tree;
   redistributing the modification operations of the initial sets of modification operations among the initial sets of modification operations, to identify a plurality of work sets of modification operations to be performed on the internal nodes of the tree level immediately above the leaf nodes by the threads in parallel; and
   performing in parallel, by the threads, the respective work sets of modification operations on the internal nodes of the tree level immediately above the leaf nodes.

5. The method of claim 3, wherein modifying internal nodes of a particular tree level comprises:
   identifying in parallel, by the threads, a plurality of initial sets of modification operations that need to be made to the internal nodes of the particular tree level, to account for effects of the modification operations performed on the internal nodes of an immediately lower tree level;
   effectively redistributing the modification operations of the initial sets of modification operations among the initial sets of modification operations, to effectively identify a plurality of work sets of modification operations to be performed on the internal nodes of the particular tree level by the threads in parallel; and
   performing in parallel, by the threads, the respective work sets of modification operations on the internal nodes of the particular tree level.

6. The method of claim 3, wherein modifying a particular internal node of any tree level by a thread further comprises, after performing a modification operation on the particular internal node by the thread:
- splitting the particular internal node, by the thread, into two or more internal nodes, in response to the modified particular internal node exceeding an upper limit on a number of elements an internal node can hold; or
- removing the particular internal node, by the thread, in response to the modified particular internal node falling below a lower limit on a number of elements an internal node must hold.

7. The method of claim 1, wherein the sequence of ordered operations comprises one or more retrieve operations to retrieve one or more data elements associated with a key, insert operations to append one or more data elements to a data structure associated with a key, or deletes operations to remove one or more data elements from a data structure associated with a key.

8. The method of claim 1, wherein at least two threads out of the plurality of threads are executed by different processor cores out of the one or more processor cores.

9. An apparatus comprising:
- a computer-readable memory or storage to store a B+ tree;
- a processor arrangement coupled to the memory, the processor arrangement comprising one or more processing cores;
- a control module to be operated by the processor arrangement to partition a sequence of ordered operations to be performed on the B+ tree, to generate a plurality of initial sets of ordered operations to be respectively associated with multiple parallel tree operation modules; and
- the multiple parallel tree operation modules, wherein the multiple parallel tree operation modules are to:
  - redistribute the ordered operations of the plurality of initial sets among the plurality of initial sets to identify a plurality of set-wise independent work sets of operations to be performed on the B+ tree by the parallel tree operation modules in parallel; and
  - perform in parallel the plurality of set-wise independent work sets of operations on leaf nodes of the B+ tree; and
  - modify internal nodes of the B+ tree to account for effects of the operations performed on the leaf nodes of the B+ tree.

10. The apparatus of claim 9, wherein the parallel tree operation modules are to, as part of identification of the plurality of set-wise independent work sets of operations:
- respectively search the B+ tree, using the respective initial sets of operations out of the plurality of initial sets of operations, to respectively identify and generate a plurality of initial sets of leaf nodes for the parallel tree operation modules to respectively perform operations on; and
- respectively generate a plurality of work sets of leaf nodes, based at least in part on the plurality of initial sets of leaf nodes, by respectively selecting leaf nodes in corresponding sets of the plurality of initial sets of leaf nodes;

wherein:
- the parallel tree operation modules are ordered;
- the leaf nodes selected from a corresponding initial set by a particular parallel tree operation module are leaf nodes not in any initial sets corresponding to parallel tree operation modules with lower-ordered than the respective parallel tree operation module; and
- the set-wise independent work sets of operations are subsets of the sequence of ordered operations correspondingly associated with the work sets of leaf nodes.

11. The apparatus of claim 9, wherein the multiple parallel tree operation modules are further to be operated by the processor arrangement to respectively:
- successively modify internal nodes of the B+ tree, one tree level at a time, for all internal nodes of all tree levels below a root node; and
- modifying thereafter, by one of the parallel tree operation modules or a control module, the root node.

12. The apparatus of claim 11, wherein the multiple parallel tree operation modules are to, as part of modification of internal nodes of a particular tree level:
- identify, in parallel, a plurality of initial sets of modification operations that need to be made to the internal nodes of the particular tree level, to account for effects of the modification operations performed on the internal nodes of an immediately lower tree level; and
- redistribute the modification operations of the initial sets of modification operations among the initial sets of modification operations, to identify a plurality of work sets of modification operations to be performed on the internal nodes of the particular tree level by the parallel tree operation modules in parallel; and
- perform, in parallel, the respective work sets of modification operations on the internal nodes of the particular tree level.

13. The apparatus of claim 9, wherein at least two parallel tree operation modules out of the multiple parallel tree operation modules are operated by different processor cores out of the one or more processor cores.

14. One or more non-transitory computer-readable media comprising instructions that, in response to execution by a computing device, cause the computing device to:
- receive with a control task a sequence of ordered operations to be performed on a B+ tree,
- partition with the control task the sequence of ordered operations to generate a plurality of initial sets of ordered operations to be respectively associated with a plurality of threads;
- redistribute with the plurality of threads, the ordered operations of the plurality of initial sets among the plurality of initial sets to identify a plurality of set-wise independent work sets of operations to be set-wise respectively performed on leaf-nodes of the B+ tree in parallel by the threads; and
- perform in parallel, with the corresponding plurality of threads, the plurality of set-wise independent work sets of operations on the leaf nodes of the B+ tree; and
- modify, with at least the plurality of threads, internal nodes of the B+ tree to account for effects of the operations performed on the leaf nodes of the B+ tree.

15. The computer-readable media of claim 14, wherein redistribute to identify comprises, the threads:
- respectively search the B+ tree, using respective initial sets of operations out of the plurality of initial sets of operations, to respectively identify and generate a plurality of initial sets of leaf nodes for the threads to respectively perform operations on; and
- respectively generate a plurality of work sets of leaf nodes, based at least in part on the plurality of initial sets of leaf nodes, by respectively selecting leaf nodes in corresponding sets of the plurality of initial sets of leaf nodes;

wherein:
- the threads have corresponding thread identifiers that are ordered;

the leaf nodes selected from a corresponding initial set by a particular thread are leaf nodes not in any initial sets corresponding to threads with thread identifiers that are lower than the thread identifier of the respective thread; and the set-wise independent work sets of operations are subsets of the sequence of ordered operations correspondingly associated with the work sets of leaf nodes.

16. The computer-readable media of claim 14, wherein modify comprises:

successively modify, by the threads, internal nodes of the B+ tree, one tree level at a time, for all internal nodes of all tree levels below a root node; and modifying thereafter, by one of the threads or a control task, the root node.

17. The computer-readable media of claim 16, wherein modify internal nodes of a particular tree level comprises:

identify in parallel, by the threads, a plurality of initial sets of modification operations that need to be made to the internal nodes of the particular tree level, to account for effects of the modification operations performed on the internal nodes of the immediately lower tree level;

redistribute the modification operations of the initial sets of modification operations among the initial sets of modification operations, to identify a plurality of work sets of modification operations to be performed on the internal nodes of the particular tree level by the threads in parallel; and perform in parallel, by the threads, the respective work sets of modification operations on the internal nodes of the particular tree level.

* * * * *